United States Patent [11] 3,627,992

[72] Inventors Ronald C. Davies Kearns; Franklin D. Wareham, Salt Lake City; Floyd L. Larson, Granger; Stephen L. Stumph, Salt Lake City, all of Utah
[21] Appl. No. 854,353
[22] Filed Aug. 18, 1969
[45] Patented Dec. 14, 1971
[73] Assignee Bio-Logics, Inc.

[54] READING ENCODED DEVICES
8 Claims, 12 Drawing Figs.

[52] U.S. Cl. .... 235/61.11 J, 23/253, 73/53, 235/61.12 R, 235/201
[51] Int. Cl. .... G01n 31/00, G01n 11/00, G06m 1/12, G06k 7/02, G06k 12/06
[50] Field of Search .... 235/61.117, 61.115, 61.12, 61.11 E, 201 FS; 250/219 I; 73/53; 179/90 CL; 137/81.5; 23/253

[56] References Cited
UNITED STATES PATENTS

| | | | |
|---|---|---|---|
| 3,320,369 | 5/1967 | Hershey | 179/90 CL |
| 3,461,305 | 8/1969 | Moulton | 250/219 |
| 3,474,230 | 10/1969 | McMillen | 235/61.7 |

*Primary Examiner*—Daryl W. Cook
*Assistant Examiner*—Robert M. Kilgore
*Attorney*—Lynn G. Foster ABSTRACT: Apparatus and methods for reading a device presenting rows of encoded and unencoded sites, each row having a control site and coded information at the other sites, the apparatus including a reading head, with a plurality of fluidic sensors, and a device-receiving lift assembly for relatively displacing the reading head and the encoded device. The rows of sites are successively fluidically sensed, with a given row being sensed after the control site of the row is correctly positioned in the reading head and electrical signals, derived from the fluidic signals and representing the code of each row, are converted to Binary Coded Decimal (BCD) data format and stored in a circulating shift register in a row-by-row fashion so that the stored information can be subsequently converted into human readable form, if desired. A fluidic circuit governs the timing and rate of relative displacement of the reading head and the encoded device and sequences the fluid flow to the fluidic sensors.

INVENTORS
RONALD C. DAVIES
FRANKLIN D. WAREHAM
FLOYD L. LARSON
STEPHEN L. STUMPH

BY Lynn G. Foster
ATTORNEY

READING ENCODED DEVICES

FIELD OF THE INVENTION

The present invention relates generally to identification systems and particularly to methods and apparatus for reading an encoded device.

BRIEF SUMMARY AND OBJECTS OF THE INVENTION

An encoded device is read by relatively displacing the encoded device and a reading head so that the code is sensed at the reading head. The sensed code is then made available for output, e.g., to a computer, printer or display.

It is a primary object of the present invention to provide novel apparatus and methods for reading encoded devices.

Another paramount object is the provision of novel apparatus and methods for processing information previously read from an encoded device.

Another principal object of the present invention is the provision of improved fluidic apparatus and methods for reading an encoded device.

These and other objects and features of the present invention will become more fully apparent from the following description and appended claims taken in conjunction with the accompanying drawings.

DETAILED DESCRIPTION OF THE ILLUSTRATED EMBODIMENT

Although the present invention has diverse applications, for convenience of description and illustration the following is directed primarily toward reading an encoded plate removably attached to a blood collection container (tube) which is filled with a sample drawn from a patient in a hospital, clinical laboratory, etc. Throughout this specification like parts are designated by like numerals.

GENERAL

Figure 1:
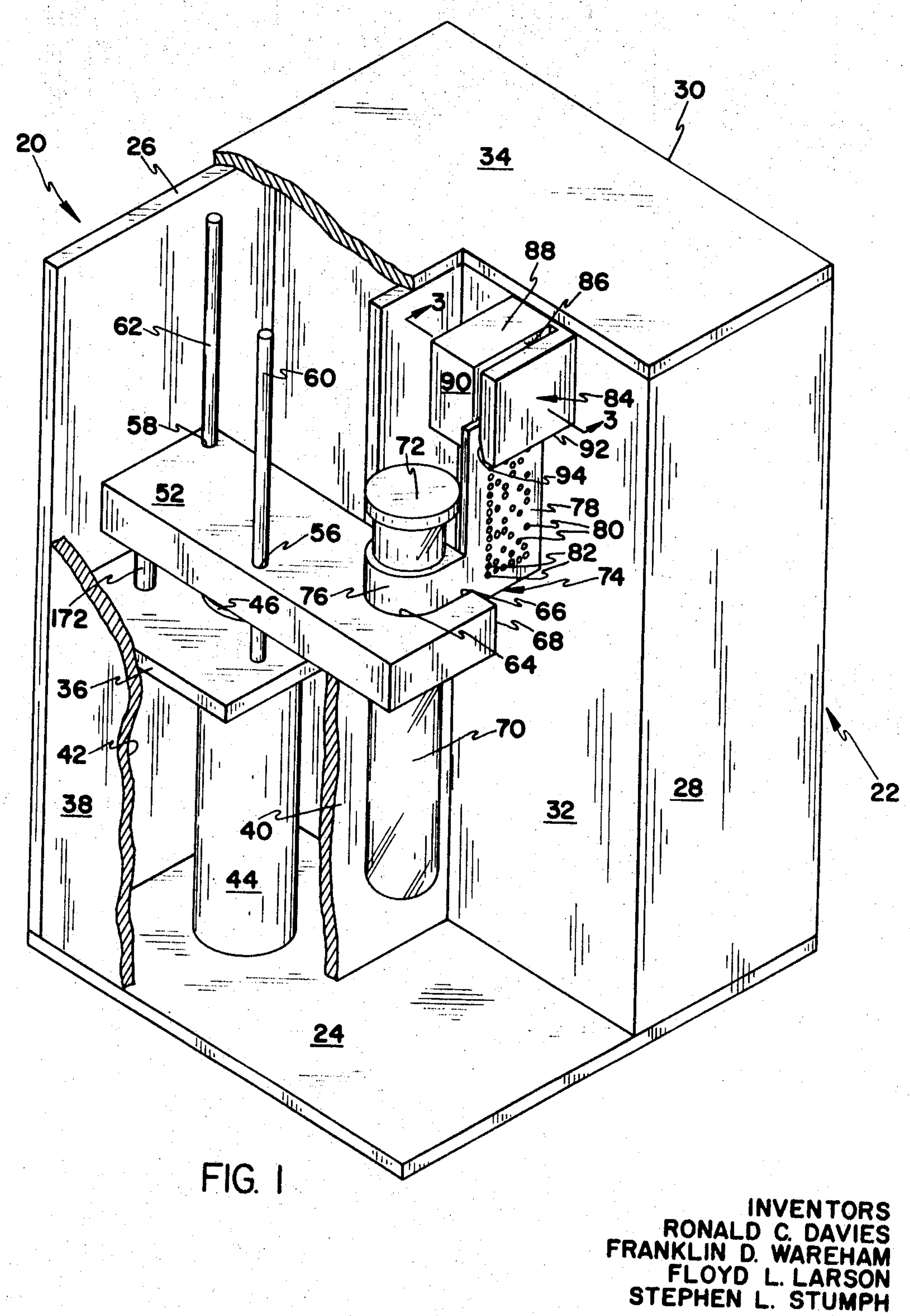
FIG. 1 is a perspective illustration of a presently preferred lift assembly and reading head in an at-rest position and also illustrates a blood sample tube with an encoded plate attached to the tube by a split collar.
Figure 2:
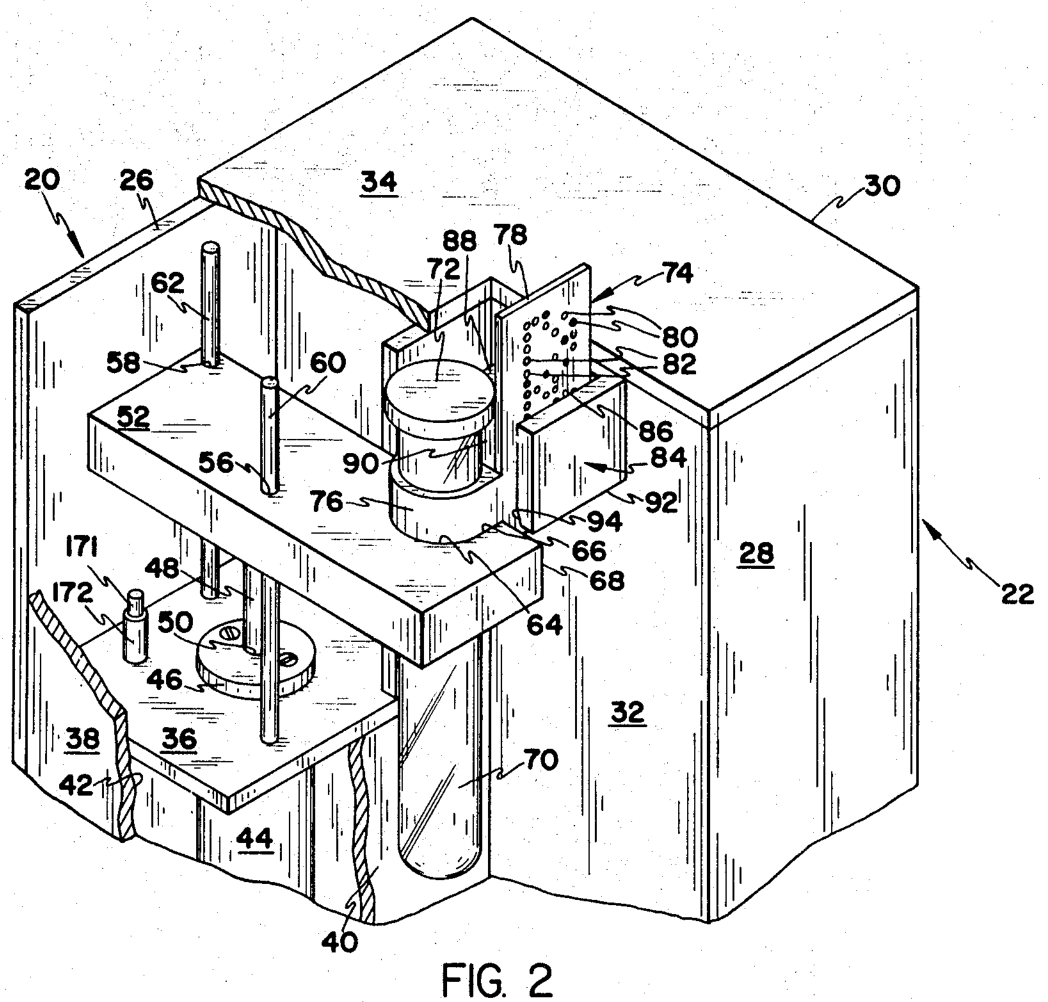
FIG. 2 is a fragmentary perspective similar to FIG. 1 of the reading head with the encoded plate disposed in an active, reading position.

Referring now to FIGS. 1 and 2, the reader, generally designated 20, comprises a frame 22 having a base 24, sidewalls 26 and 28 and a back wall 30, all screwed or otherwise secured together. The sidewall 28 is of shorter length than the sidewall 26 and terminates essentially central of the base 24 at a central integral partition 32. The cavity formed by the central partition and the walls 26, 28 and 30 is used as a control component compartment into which fluidic control apparatus (herein after more fully described) is disposed. The compartment is suitably closed by an L-shaped horizontal top plate 34.

Forward of the compartment, a horizontal anchor plate 36 is secured to the wall 26 and the partition 32 and is vertically supported by a short plate 40. The front of the cavity below the plate 36 is covered by a vertical plate 38. The cavity 42 beneath the plate 36 contains an air cylinder 44 which is conventionally anchored to the anchor plate 36 at an annular cap 46.

A rod 48 extends from the lift cylinder 44 and is attached to a piston 140 (FIG. 5) within the cylinder 44. The leading end of the rod 48 is appropriately mounted to a rectangular arm in axially fixed relation. The arm 52 has through-bores 56 and 58 respectively receiving guide rods 60 and 62 in close fit though slidable relation. Although not shown, the top ends of the guide rods 60 and 62 are anchored to the top plate 34. The arm 52 is displaced vertically along the guide rods 60 and 62 in response to elevation by the cylinder 44 of the piston rod 48.

A pneumatic position switch 172 with an actuator button 171 is carried upon the plate 36 beneath the arm 52. The purpose and function of the position switch 172 will be subsequently more fully described.

The right end of the arm 52 extends beyond the plate 36 and the extended portion of the arm contains a stepped annular bore 64 which is larger at the top and which opens in a tangentially directed slot 66 at the back side 68 of the arm. A conventional blood collection container in the form of a tube 70 is shown situated in the bore 64 of the arm 52 and is held therein by an interference engagement of a felt strip (not shown) which is cemented to the bore 64 surface and the split collar 76.

Figure 4A:
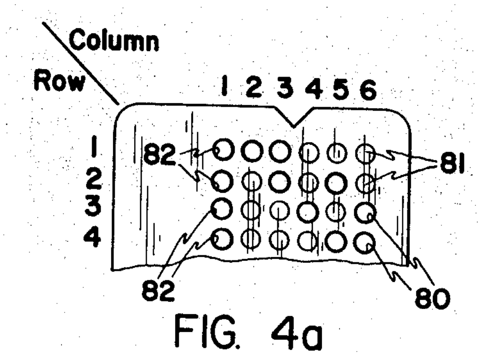
FIG. 4*a* is a fragmentary representation of the encoded plate of FIGS. 1 and 2.
Figure 4:
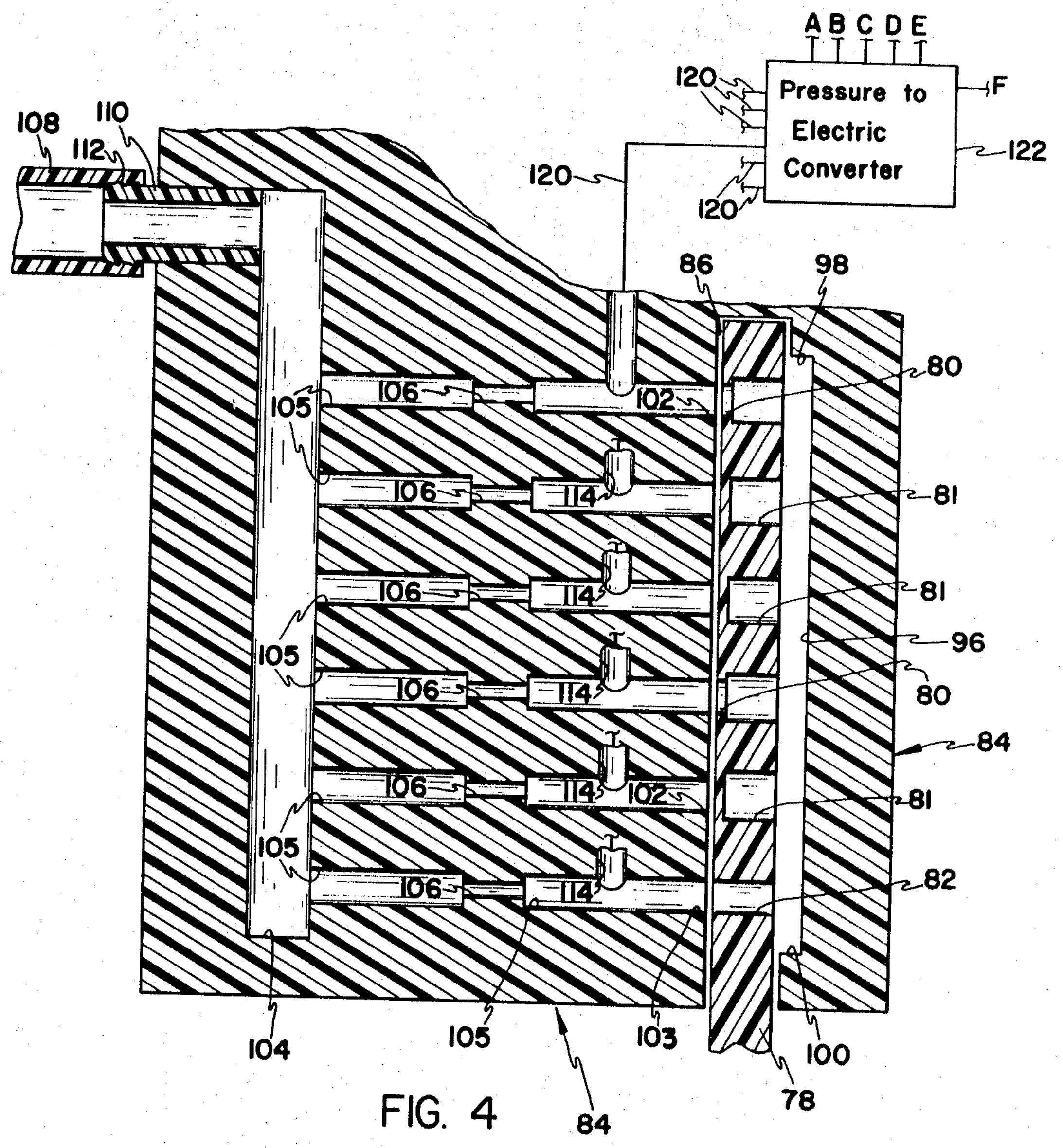
FIG. 4 is an enlarged fragmentary cross-sectional view showing the reading head with the encoded plate in a reading position and circuit logic shown diagrammatically in part.

The split collar comprises part of a removable encoded device, generally designated 74, which may be formed of suitable plastic or other material. The device 74 in addition to the split collar 76 comprises an outwardly directed flat plate 78. The plate 78 has a plurality of encoded sites 80 each comprising a perforation as well as unencoded sites 81 (FIGS. 4 and 4*a*). The encoded and unencoded sites are disposed in horizontal rows and vertical columns over much of the surface of the plate 78 (see FIG. 4*a*). Of course, the plate 78 as illustrated in FIGS. 1 and 2, has been preencoded at sites 80 by perforating so that at least some, if not all of the rows of encoded information on the plate 78 comprises a "two of five" code, hereinafter to be more fully explained.

Importantly, the column of perforation 82 comprising the first perforation of each row comprises control sites which causes a "permit-to-read" signal to be generated in the circuit logic. Each permit-to-read signal is used to perform certain checks within the circuit logic.

It should be noted that the device 74 is oriented so that the plate 78 is disposed in the tangential slot 66 of the arm 52. This orientation is preserved during operation of the apparatus 20 and causes the plate 78 to be reciprocated through a slot in the reading head.

RELATIONSHIP OF THE ENCODED DEVICE AND THE READING HEAD

More specifically, when the tube 70 is carried by the arm 52 upwardly in a vertical direction, the device 74 will approach the reading head, generally designated 84. The reading head 84 has a vertically disposed slot or passageway which opens at the top 88, at the front face 90 and at the bottom 92 of the reading head 84. The passageway 86 comprises an outwardly divergent entryway at 94 immediately above the bottom edge 92. Thus, the entryway 94 of the slot 86 will guide the plate 78 into proper reading position in the passageway 86 as the lift platform 52 moves the tube 70 and the encoded device 74 relative to the reading head 84, as shown in FIG. 2. Clearly, if desired, the tube 70 and the encoded device 74 may be held stationary and the reading head 84 vertically displaced to accomplish the reading cycle. Also, both the head and the device may be simultaneously oppositely displaced, if desired.

THE READING HEAD

Figure 3:
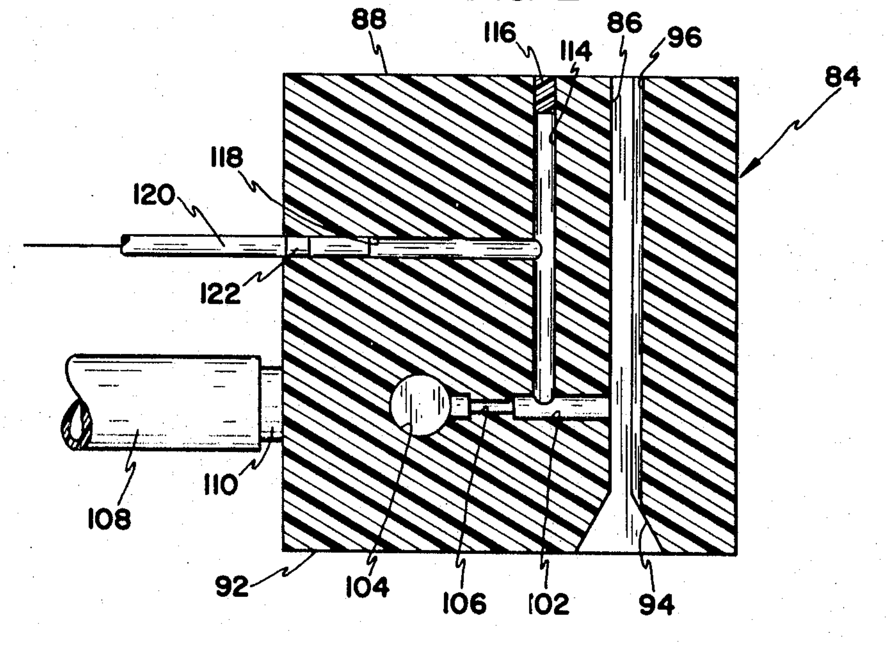
FIG. 3 is an enlarged cross-sectional view taken along line 3—3 of FIG. 1 with the frame of the apparatus removed.

Referring now particularly to FIGS. 3 and 4, the reading head 84 will be more fully described. The passageway 86 is somewhat centrally enlarged at 96 and is therefore stepped outwardly to provide shoulders 98 and 100 (FIG. 4). The passageway 86 is in open communication with five spaced, horizontally aligned reading ports 102 and a permit-to-read port 103, each comprising the fluidic nozzle of a pressure sensor. Nozzles 102 are in individual communication with a pressurized fluid supply conduit 104 and a fluid line 105 containing a fluid restrictor 106 is interposed between each nozzle 102 and the supply conduit 104. Air under pressure from a conventional source (not shown) is communicated by a tube 108 (FIG. 3) to a fitting 110 of the reading head, which fitting is in open communication with the supply conduit 104. The fitting 110 has peripheral serrations 112 upon which the tube 108 is telescopically press-fit in airtight relation.

A bore 114 is shown transversely intersecting each of the fluid lines 105 between the restrictor 106 and the nozzle 102. Each bore 114 is illustrated as being closed by a plug 116 (FIG. 2) at the top surface 88 of the head 84. Also, each bore 114 is in open communication with a bore 118 (FIG. 3) into which a thin-wall copper tube 120 of corresponding inside diameter is press-fit or otherwise secured in airtight relation.

A pressure-to-electric converter 122, in the form of pressure switches **122*a* and pressure-to-electrical transducers 122*b*, is situated at the end of all tube 120 so as to convert air back pressure from the nozzles 102** to an electrical voltage (see FIG. 4). It is presently preferred that a relatively low voltage state be developed by the associated transducer when the air back pressure from a given nozzle is at a predetermined low level, and a relatively high voltage state be developed by the transducer when the back pressure is at a relatively high level.

These voltages are thereafter processed through circuit logic from which output signals to a printer, a display and/or a computer are derived.

OPERATION OF THE FLUIDIC READER

In the operation of the reader, the encoded plate 78 of the device 74 is disposed in the passageway 86 by displacement of the lift platform 52 into the elevated position, as illustrated in FIG. 4. Thereafter, as the plate 78 is gradually displaced downward by corresponding displacement of the lift arm 52, the rows of encoded and unencoded sites will serially become disposed in registry with the five nozzles 102 and the additional nozzle 103.

Let it be assumed for the purposes of this specification, that the plate 78 contains six columns and 18 rows of unencoded and encoded sites. All of the sites in the left-hand column are perforated and serve to indicate when a given row is aligned with the fluidic nozzles. Let it further be assumed that each site of the right five columns of the bottom five rows (rows 14–18) potentially designates a chemical test or series of tests which may be performed in a clinical laboratory. Thus, the sites which are actually perforated (encoded) in the bottom five rows of the right five columns designate in fact tests which must be performed on the associated sample of the collection tube 70. Let it further be assumed that the top 13 rows (rows 1–13) of the right five columns serve to identify the patient from whom the sample was taken and provide additional information concerning the patient. The illustrated code of the top 13 rows is a two of five code, i.e., where two and only two sites in each row are perforated or encoded. Thus, the purpose of the reader is to detect the presence or absence of holes and proper parity in the plate 78 and to provide interpretation of the hole locations so that the information represented thereby can be used as an input to a computer or in human readable form in a lighted display, on a printed sheet or the like.

Specifically, as the plate 78 is continuously moved downward through the reading head, the rows of sites will successively become aligned with the fluidic nozzles 102 and 103, beginning first with row 18 and ending with row 1. When an encoded site or perforation 80 or 82 is situated in front of a fluidic nozzle 102 or 103, fluid will pass through the perforation into the centrally enlarged portion 96 of the passageway 86. Thus, back pressure exerted through the nozzle 102 or 103, the passageways 105, 114 and 118 and the tubing 120 to the associated pressure switch **122*a* will be small. Conversely, if the site has no perforation, the back pressure through the nozzle, passageways and tubing will be comparatively large. Accordingly, the presence of a perforation 80** will result in a low voltage output from the associated transducer and the absence of the perforation will result in a high voltage output. The utilization of the indicated voltage outputs from the six pressure switches will be explained more fully hereinafter in conjunction with the circuit logic.

As mentioned, it is presently preferred that each of the rows of sites be provided with only two encoding perforations 80. Thus, with reference to FIG. 4*a*, it can be seen that the perforations of the first four rows, if these rows defined a patient identification number, would represent the numerals 1590, where column 1 presents the permit-to-read hole used to identify the increment of time during which a particular row of sites in the plate 78 are aligned with the reader fluidic nozzles. Column 2 represents parity, column 3 represents the numeral one, column 4 represents the numeral two, column 5 represents the numeral four and column 6 represents the numeral seven.

THE FLUIDIC LOGIC

Figure 5:
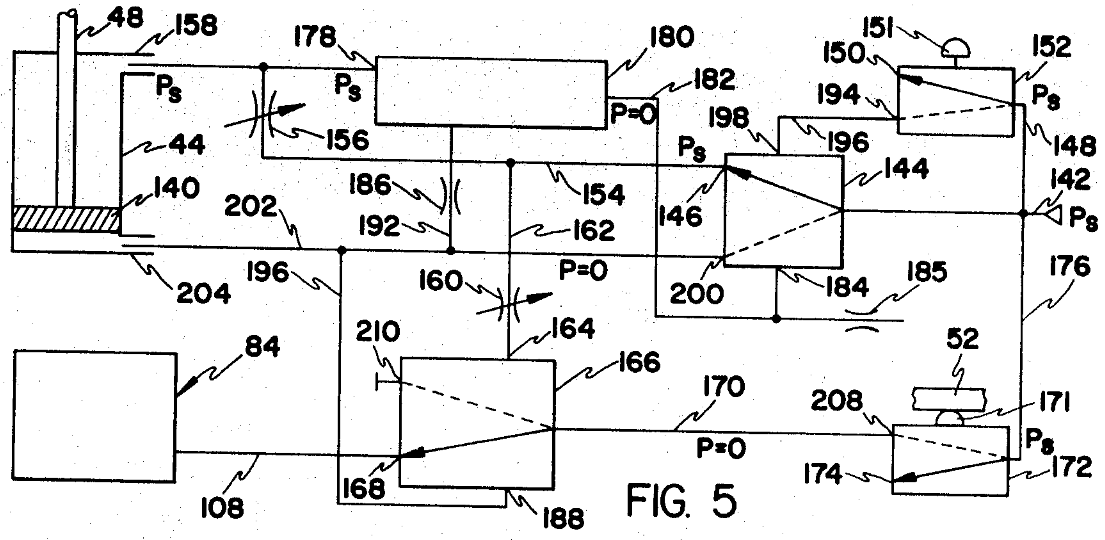
FIGS. 5–7 respectively illustrate the presently preferred fluidic circuit in each of its three states of operation.
Figures 6, 7:
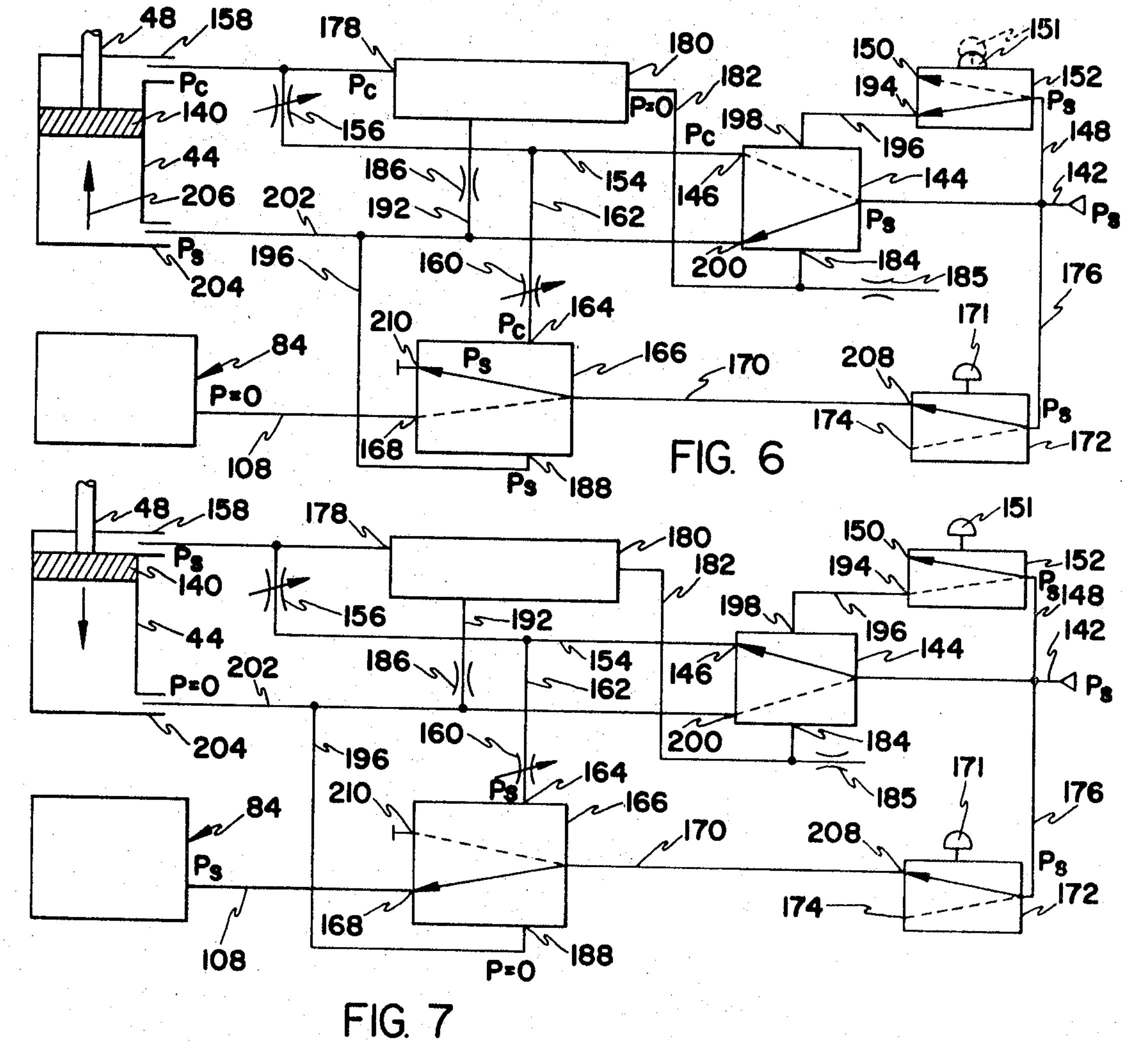

With reference to the fluidic logic of FIGS. 5–7, three separate operational states are illustrated: (1) the initial or inactive state (FIG. 5), (2) the lifting state (FIG. 6) and (3) the reading state (FIG. 7).

In the inactive state of FIG. 5, the piston 140 and the piston rod 48 rest in their lowest position in the cylinder 144. Air under pressure is received from a source (not shown) and impressed upon the top surface of the piston 144, having been communicated to the rod end of the cylinder 44 through line 142, flip-flop 144, port 146, line 154, variable resistor 156 and port 158. So long as the spring-loaded button 151 of the fluidic switch 152 is in the extended position of FIG. 5, the switch continues to vent air at supply pressure $P_s$ through port 150 and the state of the flip-flop 144 remains as illustrated. Also, so long as the platform 52 maintains the spring-loaded button 171 of the switch 172 in its depressed position, the switch 172 will shut off the air at supply pressure $P_s$ at 174. Consequently, no air under pressure will reach reading head 84.

When it is desired to lift the platform 52 for the purpose of reading an encoded device 74, the actuator button 151 is momentarily depressed or caused to be momentarily depressed in any suitable way. This causes air at supply pressure $P_s$ to travel through line 148, switch 152, port 194, line 196 and into the flip-flop 144 at port 198 thereby causing the flip-flop 144 to change state. Thus, air at supply pressure $P_s$ impressed at line 142 will be discharged from the flip-flop 144 at port 200 and will be received at port 204 of the cylinder 44 after having been communicated through line 202. Hence, the air at supply pressure $P_s$ will cause the piston 140 to be lifted within the cylinder 44 thereby elevating the arm 52 ultimately to its ready-to-read position. As the piston 140 is displaced upwardly, the air disposed within the cylinder 44 above the piston 144 will vent from the cylinder through port 158 as a control pressure $P_c$ and will be impressed upon the pressure amplifier/control valve 180 at 178 and upon the flip-flop 166 at 164. The force balance of supply pressure $P_s$, also impressed upon the pressure control 180 through line 192, and control pressure hold the amplifier/control valve closed so that the output pressure at line 182 remains zero.

It is important to know that in the lifting state of FIG. 6, the supply pressure $P_s$ is also communicated from the line 202 to the port 188 of flip-flop 166 through the line 196. Since the supply pressure $P_s$ is greater than the control pressure $P_c$ (impressed at port 164 from the top of the cylinder through the variable resistor, 156, the lines 154 and 162 and the variable resistor 160), the flip-flop 166 changes state. Consequently, even though the switch 172 now delivers air under supply pressure $P_s$ from the line 176 through port 208 and line 170 to the flip-flop 166 (because the platform 52 has been elevated to allow the button 171 to assume its extended position), the air under supply pressure $P_s$ is blocked at port 210 from the flip-flop 166. Hence, during the lifting state of FIG. 6, no air under pressure reaches the reading head.

Obviously, once the button 151 is released, it returns by a spring bias to its elevated position shown in dotted lines in FIG. 6 causing the air under supply pressure $P_s$ received from line 148 to be blocked at port 150 of the switch 152. Nevertheless, the changed state of flip-flop 144 is maintained.

At the end of the lifting state, i.e., when the piston 140 has reached the top of its travel, the control pressure $P_c$ at port 178 to the pressure control 180 is zero. Therefore, the supply pressure $P_s$ impressed upon the pressure amplifier/control valve through line 192 is ported as output pressure $P_o$ through line 182 and impressed upon the flip-flop 144 through line 184 and vented at bleeder 185. This output pressure $P_o$ that causes the flip-flop 142 to change state so that air under supply pressure $P_s$ reaches the rod side of the piston 140 at port 158 through line 142, port 146, line 154 and variable resistor 156. Consequently, the piston 140 will commence its downward travel. At the same time, the supply pressure $P_s$ in line 154 is communicated to port 64 of the flip-flop 166 through line 162 and variable resistor 160. The air under supply pressure $P_s$ impressed at port 164 causes the flip-flop 166 to change state since the pressure at port 188 is zero. Consequently, air at supply pressure $P_s$ is delivered to the reading head 84 through line 176, port 208, line 170, port 168 and line 108 to cause the fluidic sensors including the nozzles 102 and 103 to read the encoded plate 78 as it is continuously displaced relative to the reading head by the platform 52 which descends with the piston 140.

Once the end of the reading state has been achieved, i.e., when the piston 140 is in its lowest position within the cylinder 44, the fluidic logic is returned to the inactive state of FIG. 5 in readiness for another cycle as above described.

CIRCUIT LOGIC

Figure 8:
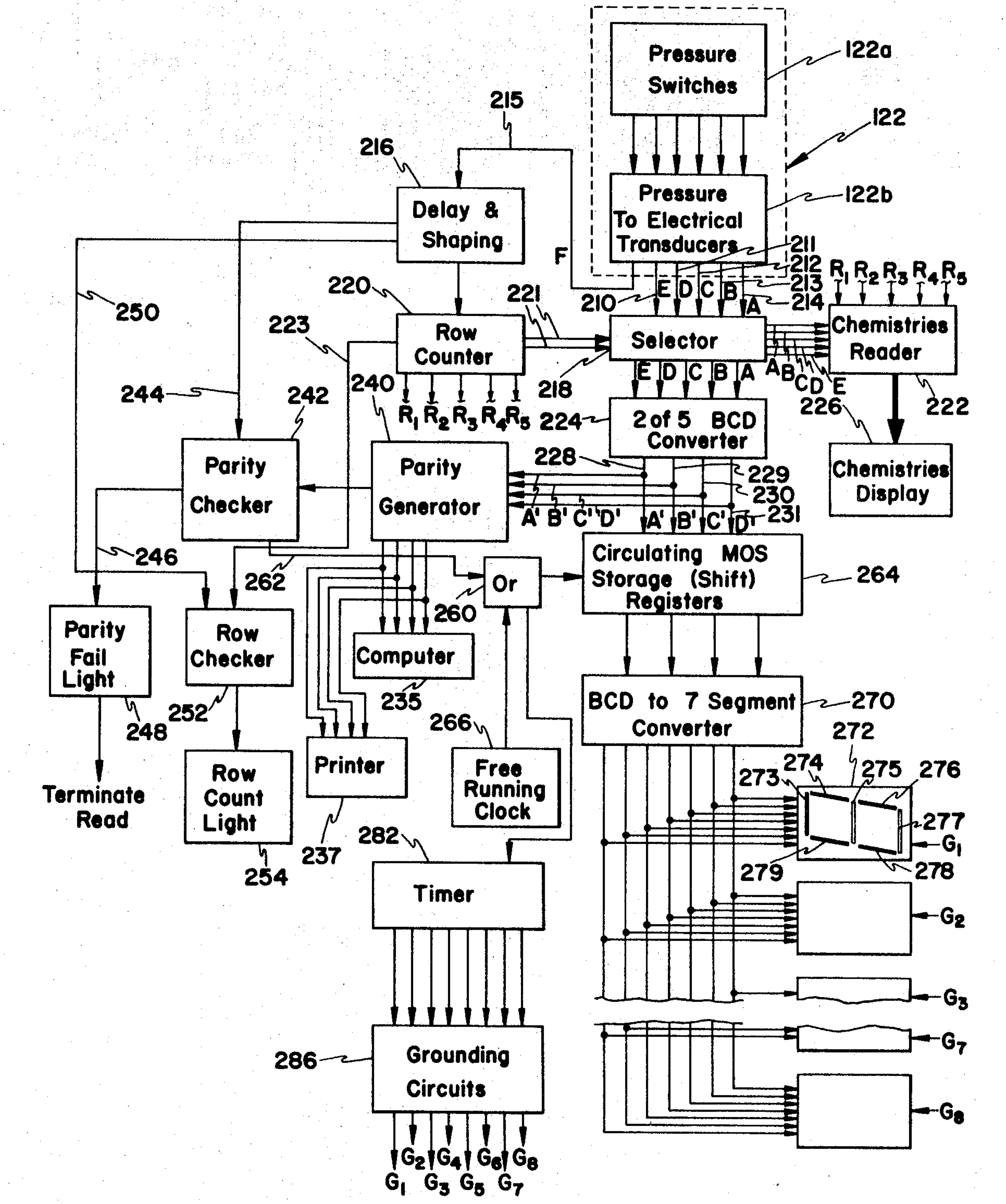
FIG. 8 is a block diagram of the presently preferred circuit logic for developing a usable output from the fluidic signals.

The output of the pressure-electric transducers 122*b* consists of five information lines 210–214 bearing the two of five code signals A through E and one timing line 215 bearing the so-called permit-to-read signal F. See FIG. 8. The permit-to-read signal is conditioned by the delay and shaping circuit 216 to provide a short window pulse. The window pulse is used as a timing signal and will be further explained hereinafter.

The five lines 210–214 from the pressure to electric transducers 122*b* are input to a selector 218. The selector 218 is gated by the row counter 220 through line 221. The row counter 220 counts the number of rows of encoded or information sites which have been read by the reading head at any given point in time and outputs a signal when a predetermined number of rows have been completed. The row counter also outputs a signal to the row checker 252 through the line 223 when its count is the same as the number of rows to be counted.

During reading of the bottom five rows of the plate by the reading head, the selector 218 will gate the chemistry signals A–E to the chemistries reader 222. During the reading of the remaining rows, the selector 218 will gate the two of five signals A–E to the BCD-converter 224. Signals received by the chemistries reader 222 are processed and displayed upon the chemistries display 226, while the signals received by the BCD-converter 224 are processed as hereinafter described.

The converted output information from the BCD-converter consists of four signals communicated through lines 228–231, the four signals bearing the same numeric information as the two of five signals but in BCD (Binary Coded Decimal) format. BCD is useful since most printers, computer terminals, etc., use the BCD-format. Therefore, the BCD-output can be channelled to a computer 235 and/or a printer 237. The BCD-conversion is also useful in determining correct parity of the numeric information. Parity is defined to exist when the two of five code is converted into an acceptable BCD-number. The check to determine whether parity exists is made in the parity generator 240 and the parity checker 242.

The output of the parity generator is significant only at one instant of time for each row of the encoded plate. This time is determined by the window pulse emanating from the delay and shaping circuit 216 and reaching the parity checker 242 through line 244. The parity checker 242 waits until the window pulse occurs and then outputs a signal which depends on the existence of parity in the parity generator 240 at the time the window pulse occurs. Valid parity is indicated by a low voltage output from the generator 240. A high output from the generator 240 indicates that at the indicated instant in time no acceptable parity condition was detected.

If no parity exists at the instant in time when the window pulse occurs, a signal will be sent from the parity checker 242 through the line 246 to the parity fail light 248 providing a visual warning to the operator. Also, the parity checker disables further output through line 262 to the OR-circuit thereby terminating the read cycle.

In the event that the row checker 252 receives a signal from the delay and shaping circuit 216 after having received a signal from the row counter, during the same cycle, the row count light 254 is illuminated, indicating to the operator that an error has been made.

Also, when parity exists at the time the window pulse is received, the parity checker 242 outputs a signal to the OR-circuit 260 through line 262. The OR-circuit transmits the signal to the shift input of the circulating MOS storage shift registers 264. The registers 264 also receive the four BCD-signals A′–D′.

When the shift pulse occurs in the register 264, the BCD information derived from the two of five BCD-converter is shifted into storage. After the cumulative number of shift pulses received equals the number of rows to be read on the plate, the storage registers in 264 are fully loaded. At this time, the free-running clock 266 transmits clock pulses through the OR-circuit 260 to shift the input of the storage registers 264 causing the information in the registers to serially circulate continuously.

At the time of each circulation, the recirculating output from the last storage stage is also inserted into the BCD to seven-segment converter 270. Thus, the stored rows of information are recirculated as they are output from the registers 264 to the converter 270.

The seven-segment conversion is necessary in order to drive the seven-segment display lights 272, eight of which are presently preferred. However, if more than eight rows of sites on the plate 78 are used for identification or like purposes, an equal number of lights 272 could be used. Each display light may comprise a Mosaic Indicator Model MS–6A manufactured by ALCO Electronic Products, Inc., of Laurence, Massachusetts.

The seven outputs of the converter 270 are individually connected in parallel to the corresponding lamp segment, of which there are seven identified by the numerals 273–279, in each of the eight seven-segment display lights 272.

In order to avoid simultaneous display on each light of each numeral represented by the seven-segment data, only one light 272 is grounded at any one point in time. The grounding of the lights 272 is controlled through the grounding circuits 286. The grounding of the lights 272 occurs in sequence corresponding to the sequence of the output of rows of seven-segment converted data issuing from the converter 270.

More specifically, the timer 282, which is clocked by 260, governs the sequential grounding of the lights 272.

The timer 282 generates signals selectively to ground only one light at a time in order, synchronous with the shifting of the storage registers and the output of information from registers 264 to converter 270. If fewer lights 272 are used than the number of encoded two of five information rows, a signal from a selector switch to the timer 282 can be used to sequentially display numerals corresponding to the data in sets.

For greater detail concerning all circuit logic components, except pressure switches **122*a*, the pressure-electric converter 122, the row counter 220, the selector 218, the chemistries reader 222 and the chemistries display 226**, reference may be made to the assignee's copending U.S. Pat. application Ser. No. 850,978, filed Aug. 18, 1969.

THE PRESSURE SWITCHES

Figures 9, 10, 11:
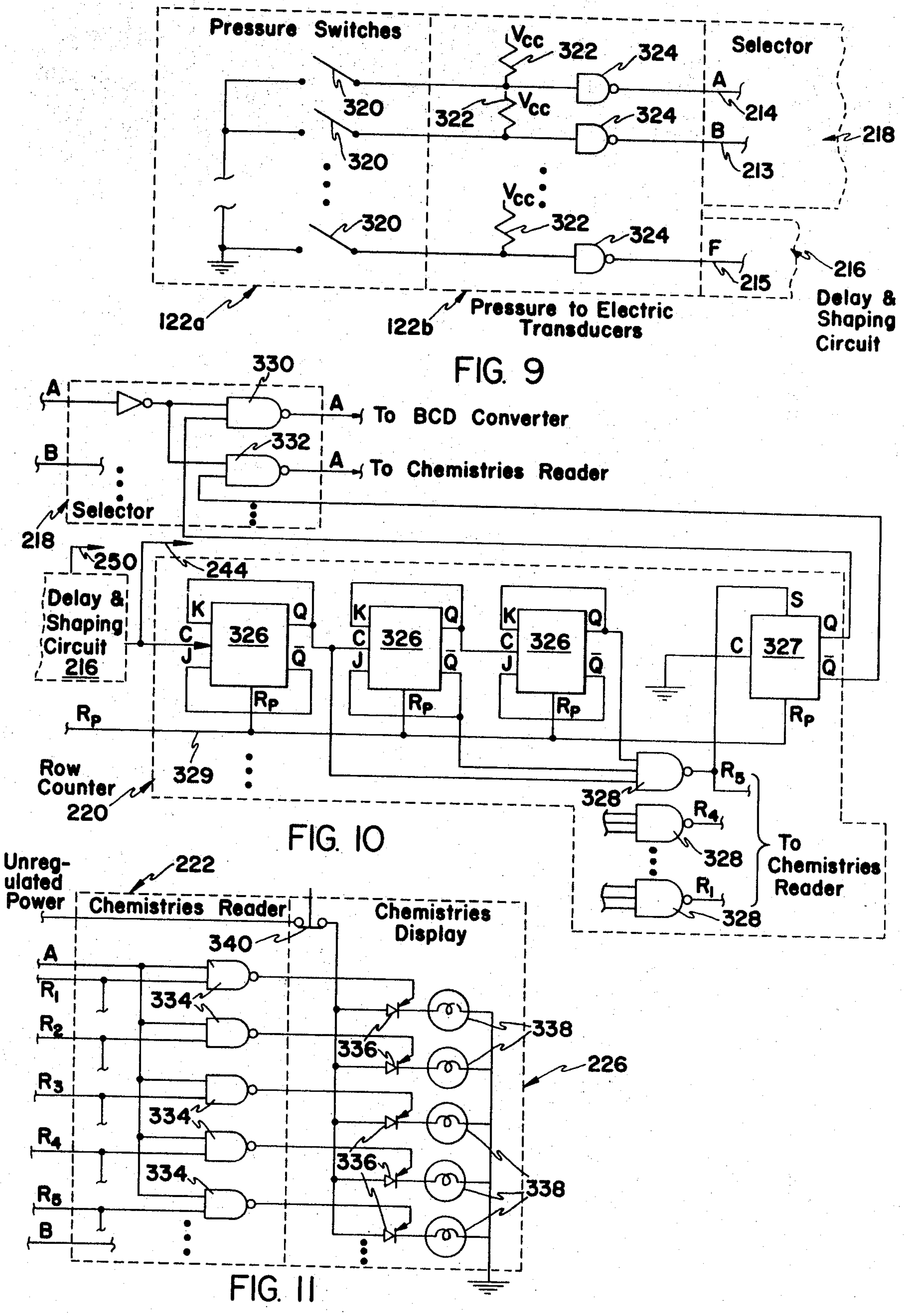
FIGS. 9–11 are circuit diagrams of specific portions of the apparatus.

The pressure switches 320, best illustrated in FIG. 9, are controlled by the existence or lack of back pressure from the fluidic nozzles 102 and 103 induced by the absence or presence of encoded holes in the plate. Each switch 320 comprises a single pole, single throw switch with one side grounded. When no hole is read by a given fluidic nozzle 102 or 103, the back pressure causes the associated switch 320 to close. When a hole is encountered the associated, normally open switch 320 remains open.

PRESSURE-TO-ELECTRIC TRANSDUCERS

With continued reference to FIG. 9, the transducers, collectively designated **122*b*, each comprises a pullup resistor 322 which inputs to an inverting AND-gate 324. The power input to each gate 324 is assumed and not shown. When the associated pressure switch is closed, current is drawn through the affiliated resistor forcing the input at the related gate to be of high voltage. Each gate with such a high voltage input responds by providing a low voltage output. Thus, a low voltage output from a given gate 324 indicates the absence of a hole in the encoded plate while the existence of a high voltage output at a given gate 324** indicates the presence of a hole in the encoded plate. By way of example, the voltage $V_{cc}$ may be on the order of 5 volts to accomplish the foregoing results in the illustrated embodiment.

ROW COUNTER

The row counter 220 comprises J–K binaries 326 connected in series to count the window pulses received from the delay and shaping circuit 226 up to the number of chemistry information rows, which in the foregoing example is five. This function is necessary to differentiate between the chemistry selection data and the numeric identification data. Specifically, when the last row of chemistry information has been counted, the last pulse, in this case R5, changes the state of 327 turning AND-gate 332 "off" and AND-gate 330 "0n." The counter 220 also generates pulses R1 through R5 through gates 328, which are used in reading and displaying the chemistries.

The counter is reset by a pulse $R_p$ in line 329 communication through a selectively actuated switch (not shown).

THE SELECTOR

The selector 218, which receives the chemistry signals and the two of five signals A–E from the transducers **122*b*, comprises selector gates 330 and 332 which are enabled and disabled inversely by the row counter 220. During the reading of the first five rows in the mentioned example, each gate 332 is enabled and the chemistries reader functions. After the fifth row has been read, each gate 330 is enabled and the BCD-information is processed from the selector to the BCD-converter 224. The designation A from the illustrated gate 332 is typical of each signal output from all the other gates 332 (not shown) to the chemistries reader 222 and the designation A from the illustrated gate 330 is typical of each signal output from all the other gates 330 (not shown) to the BCD-converter 224**.

CHEMISTRIES READER AND DISPLAY

To read the chemistries, the signal derived from each selector output (A–E) is gated at AND-gate 334 with a row counter signal ($R_1$–$R_5$) sequentially as each row is read. A high level output from a given gate 334 indicates that the particular chemistry involved has been selected to be performed. When a level at the output of any of the gates 334 goes high, the associated silicon-controlled rectifier SCR 336 is turned "on" allowing unregulated power to output through the SCR 336 to the associated lamp 338, turning it "on." The lamps are turned "off" by interrupting the current flow using the switch 340. While the illustrated circuit is concerned with only one selector output to the chemistries reader, a corresponding circuit exists for each of the other four information-bearing signals emanating from the selector 218, with the same row counter signals ($R_1$–$R_5$) being used with such circuits.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by U.S. Letters Patent is:

1. Code reading apparatus comprising:
   an encoded device formed with at least one row of code sites and having holes formed therethrough at appropriate ones of said code sites to represent the data to be read,
   a source of pressurized fluid,
   reading means connected to said source and formed with a plurality of fluid passages, each registerable with a respective one of said code sites,
   transducer means mounted to sense fluid pressure in each of said passages and operable to establish electrical signals having magnitudes indicative of the sensed pressure, and
   display means for displaying said signals.
2. The apparatus of claim 1 further comprising:
   said encoded device having a plurality of said rows of code sites, and
   positioning means providing relative movement between said encoded device and said reading means to sequentially place each of said rows of code sites of said encoded device in registry with said fluid passages of said reading means.
3. The apparatus of claim 1 further comprising:
   storage means connected to receive the signals from said transducer means and serving to store said signals in row-by-row fashion until all of said rows have been read before passing said signals to said display means.
4. The apparatus of claim 1 further comprising:
   means for generating a warning signal if an incorrect number of rows is read by said reading means.
5. The apparatus of claim 1 further comprising:
   parity means for generating a warning signal if an improper number of holes have been formed in any given row of said encoded device.
6. The method of reading data encoded by forming holes at appropriate ones of a row of coder sites on an encoded device, said method comprising the steps of:
   directing respective streams of pressurized fluid at each of said code sites,
   sensing the fluid pressure in each of said streams, and
   establishing electrical signals indicative of the magnitude of said pressure.
7. Code reading apparatus comprising:
   a container;
   an encoded identification plate situated eccentric to the container and carrying representations in the form of code sites arranged in rows;
   a collar fitted around the container and bridging between the container and the identification plate;

carriage means comprising a receiving station in which the container and collar are held by force of gravity, the carriage means comprising means for radially and vertically orienting the identification plate in relation to the carriage means;

a reading head comprising a slot situatable in direct vertical alignment with and adapted to receive the oriented identification plate, the reading head further comprising an array of sensors for simultaneously being disposed in registry with and reading the code representations row by row;

power means selectively imparting direct vertical movement to one of the carriage means and the reading head to cause relative vertical reciprocation therebetween;

means causing the sensors of the reading head to operate during only essentially one-half of the relative vertical reciprocation cycle.

8. A method of identifying the origin of biological matter contained within a tube, the steps of:

mounting a blank having a plurality of code sites arranged in rows to one side of the tube by using a bridging collar;

providing a control code in each row of code sites;

encoding the blank by altering selected ones of the code sites to create representations identifying the origin of the biological matter within the tube;

placing the tube, collar and encoded blank in a holder;

causing the holder to orient the encoded blank in respect to the holder so that the encoded blank extends vertically in a single predetermined plane;

relatively jointly displacing the encoded blank, the collar, the tube and the holder up and down in said predetermined plane in respect to a code-reading head, the head comprising a plurality of sensors and a blank-receiving slot contained in said predetermined plane;

sensing the altered ones of the encoded sites of the blank during either the up or down potion of said displacement;

translating information sensed into human readable form.

* * * * *